United States Patent [19]

Giles, Sr.

[11] Patent Number: 5,484,625
[45] Date of Patent: Jan. 16, 1996

[54] METHOD FOR PREPARING HAMBURGER PATTIES

[76] Inventor: William O. Giles, Sr., 8142 Wynlakes Blvd., Montgomery, Ala. 36117

[21] Appl. No.: 205,748

[22] Filed: Mar. 4, 1994

[51] Int. Cl.$^6$ ................................ A23L 1/317
[52] U.S. Cl. ........................................ 426/646
[58] Field of Search ..................... 426/641, 646, 426/650, 652

[56] References Cited

U.S. PATENT DOCUMENTS

| | | | |
|---|---|---|---|
| 4,263,329 | 4/1981 | Olson et al. | 426/646 X |
| 4,313,963 | 2/1982 | Greenspan | 426/641 X |
| 4,973,492 | 11/1990 | Gibson | 426/646 X |

*Primary Examiner*—Arthur L. Corbin
*Attorney, Agent, or Firm*—Dickinson, Wright, Moon, Van Dusen & Freeman

[57] ABSTRACT

The invention relates to a method for preserving the flavor and freshness of meat products, particularly hamburgers, that are prepared at the central kitchen of a fast food franchise and shipped to a retail outlet. Pursuant to the method, a hamburger is cooked and then immersed into a hot bath of flavoring solution comprising salt, hydrolyzed vegetable protein, corn syrup solids, sugar, seasoning powder, flavor enhancer, and other ingredients. The treated hamburger is then frozen and shipped to a retail outlet. At the retail outlet, the hamburger is heated in a second bath of flavoring solution that is similar to the first, and is then ready to be served. Hamburger patties prepared according to the present invention taste fresh and moist even several days after they have been cooked. The method of the present invention also significantly reduces the amount of smoke and oil produced at a fast food retail outlet.

10 Claims, 1 Drawing Sheet

METHOD FOR PREPARING HAMBURGER PATTIES

FIELD OF THE INVENTION

This invention relates in general to a method and composition for preserving the flavor and freshness of meat products, and in particular to a method and composition for preserving the flavor and freshness of hamburger patties.

BACKGROUND OF THE INVENTION

The past several decades have seen a dramatic growth in the fast food industry. As competition in the industry has become more intense, many fast food retailers have been forced to cut costs by consolidating and centralizing their operations. Consequently, most large fast food franchises today prepare their products at central kitchens, from which they are shipped out en mass to remote franchise outlets for sale to the public.

While centralized franchising operations have reduced the operating costs of fast food establishments, the extensive shipping and handling operations inherent in those systems have presented a need for more effective methods and products for maintaining the freshness and quality of fast food items. In particular, there is a great need for products and methods that are more effective than the products and methods known to the prior art in preserving the flavor and moisture content of hamburger and other meat products.

At present, numerous compositions are known to the prior art for moisturizing or tenderizing meat or meat products. For example, U.S. Pat. No. 4,746,522 (Wofford et al.) discloses a composition and method of treating meat to prevent moisture loss during cooking. The composition contains vinegar, sodium chloride (table salt), and various other ingredients. U.S. Pat. No. 4,313,963 (Greenspan) discloses a method for tenderizing cut meat portions. The tenderizing solution has a seasoning mix which contains salt, sugar, hydrolyzed vegetable protein, dextrose, monosodium glutamate, beef extract and spices. U.S. Pat. No. 5,250,312 (Mason et al.) discloses a method for retaining moisture in meat by using a dry mix containing salt and carrageenan in a certain weight ratio. The salt is of a specified particle size. In some embodiments of the invention, various spices are added to the mix, including sugar and food coloring.

Many compositions are also known to the prior art which impart flavor to meat or meat products. For example, U.S. Pat. No. 5,084,298 (Hussein et al.) discloses various flavoring compositions. Some of these compositions contain in various combinations hydrogenated vegetable or animal fats or oils, onion and garlic flavors, salt, and meat flavors. U.S. Pat. No. 4,940,590 (Williams et al.) discloses marinated meat products with a glazed coating. One such product is chicken coated with a mixture containing dextrose, corn syrup solids, and garlic and onion salts.

Several compositions are also known which are suitable for imparting a consistency to meat products, or for maintaining the natural consistency of those products. Thus, U.S. Pat. No. 4,057,650 (Keszler) discloses a curing and binding agent used to form a bacon-like meat product. In one embodiment, the agent contains salt, sugar, monosodium glutamate, and hydrolyzed plant protein. U.S. Pat. No. 5,192,569 (McGinley et al.) discloses bulking agents for aqueous foods, including a salad dressing containing sugar, salt, cellulose, onion powder, and garlic powder. The reference also discloses a frozen dessert containing corn syrup with 80% solids and sugar.

Finally, a number of prior art compositions have been developed which are specifically suitable for tenderizing, moisturizing, preserving, and adding flavor to hamburger patties. U.S. Pat. No. 2,650,167 (Garsaud), for example, discloses a method for preparing fresh, frozen, seasoned hamburger patties by combining ground beef, salt, ice water, and dehydrated onions. U.S. Pat. No. 1,829,431 (Allen) discloses a seasoning for ground meat which contains finely divided sugar, edible fatty material, extracts of peppers, and the essential oils of spices, such as coconut oil, cocoa butter, or peanut oil.

Conventional methods of cooking meat, including the methods of the references described above, call for the addition of flavoring to meat before it is cooked. In the case of hamburger patties, the flavoring is conventionally mixed with the raw ground beef before it is formed into a pattie. However, the presence of flavorings in the raw meat can interfere adversely with the natural chemical processes that occur when meat is cooked. For example, the addition of salt to ground beef prior to cooking can elevate the surface temperature of a hamburger pattie to a higher temperature than it would otherwise attain, which may result in excessive charring. Other commonly used flavorings, such as onion powder, can act as a desiccant during cooking, causing the cooked product to be excessively dry. Hence, there is a need for a method of preparing cooked meat products that will retain the moisture and natural juices of meat.

Furthermore, the addition of flavoring to meat prior to cooking can dramatically increase the bacteria content of the meat. Dried onion, for example, tends to have a very high natural bacteria count. When dried onion is mixed with raw hamburger meat in accordance with the prior art methods, the bacterial content of the meat can be increased by several orders of magnitude, thus increasing the risk of food poisoning. The problem is especially serious when the raw patties are not cooked immediately after they are formed, since the bacteria then undergoes rapid propagation.

Many commercial food processors compensate for the bacteria problem by treating onion and other spices with pesticides and food preservatives. Aside from the obvious health risks these methods present, the additives adversely affect the natural flavor of the spices. Thus, there is presently an unfulfilled need in the art for a method of preparing hamburgers and similar meat products that obviates the need for flavorings with chemical additives and that can accommodate the use of organically grown flavorings.

Another problem with prior art compositions and methods used to flavor meat products is their failure to meet the demands that current commercial practices place on them. To date, the prior art compositions and methods used to flavor, tenderize, moisturize, and preserve meat have enjoyed some success when used in food prepared at retail outlets, but have proven inadequate to meet the more severe demands placed on the quality of meat products by the extensive shipping and handling inherent in centralized franchising systems. In particular, these methods and compositions have not been successful in preserving the moisture, flavor and texture of freshly cooked hamburger over a prolonged period of time, and have been only moderately successful in controlling the growth rate of harmful bacteria that commonly lead to food poisoning.

A further problem encountered in central franchising operations is the large amounts of smoke and oil generated by cooking hamburger patties at retail outlets. This problem arises from the fact that hamburger patties have traditionally been shipped raw for subsequent cooking at the retail outlets. However, recent provisions of the Clean Air Act and similar federal and state legislation place limitations on the amount of air pollution that can be produced by fast food franchises. In areas such as downtown Los Angeles, which have had difficulty conforming with the pollution standards imposed by such legislation, these restrictions are especially severe. Furthermore, the Clean Air Act has provisions which require "nonconforming" areas of the country to employ the Best Available Technology (BAT) for reducing pollution emissions. Hence, there is, and will continue to be, a great need for new methods of producing fast food that will reduce the amount of smoke and oil produced at retail outlets.

It is therefore an object of the present invention to provide a method of applying flavoring compositions to meat products which will improve the quality of the cooked meat by retaining the moisture, freshness, and flavor of the meat without interfering with the natural chemical processes that occur during the cooking of the meat.

It is a further object of the present invention to provide new compositions and methods of flavoring, tenderizing, moisturizing, and preserving meat products, particularly hamburger patties, which will minimize bacterial content and bacterial growth in meat and which are capable of meeting the demands of a centralized franchising system.

It is still another object of the present invention to provide a method of flavoring meat products which will obviate the need for flavorings which contain pesticides and chemical additives.

Finally, it is an object of the present invention to provide a method of reducing the amount of smoke and oil generated at fast food retail outlets from the cooking of hamburger patties.

These and other objects are accomplished by the composition and method of the present invention as set forth below.

SUMMARY OF THE INVENTION

The present invention is a composition and method for moisturizing, tenderizing, flavoring, and preserving hamburgers and other meat products. Surprisingly, a hamburger prepared according to the teachings of the present invention tastes fresh even several days after it is cooked. The composition and method represent a marked improvement over prior art compositions and methods for preserving meat products in that they are highly effective in controlling the growth rate of bacteria that commonly lead to food poisoning. Furthermore, the method and composition show a remarkable ability to preserve the flavor, freshness and texture of meat over an extended period of time. The composition and method are particularly suitable for use in centralized fast food franchise operations, since the extensive shipping and handling inherent in those operations places severe demands on product quality and freshness. Furthermore, the method of the present invention significantly reduces the oil and smoke generated at fast food outlets from the cooking of hamburger patties and similar meat products.

PREFERRED EMBODIMENTS OF THE INVENTION

Figure 1:
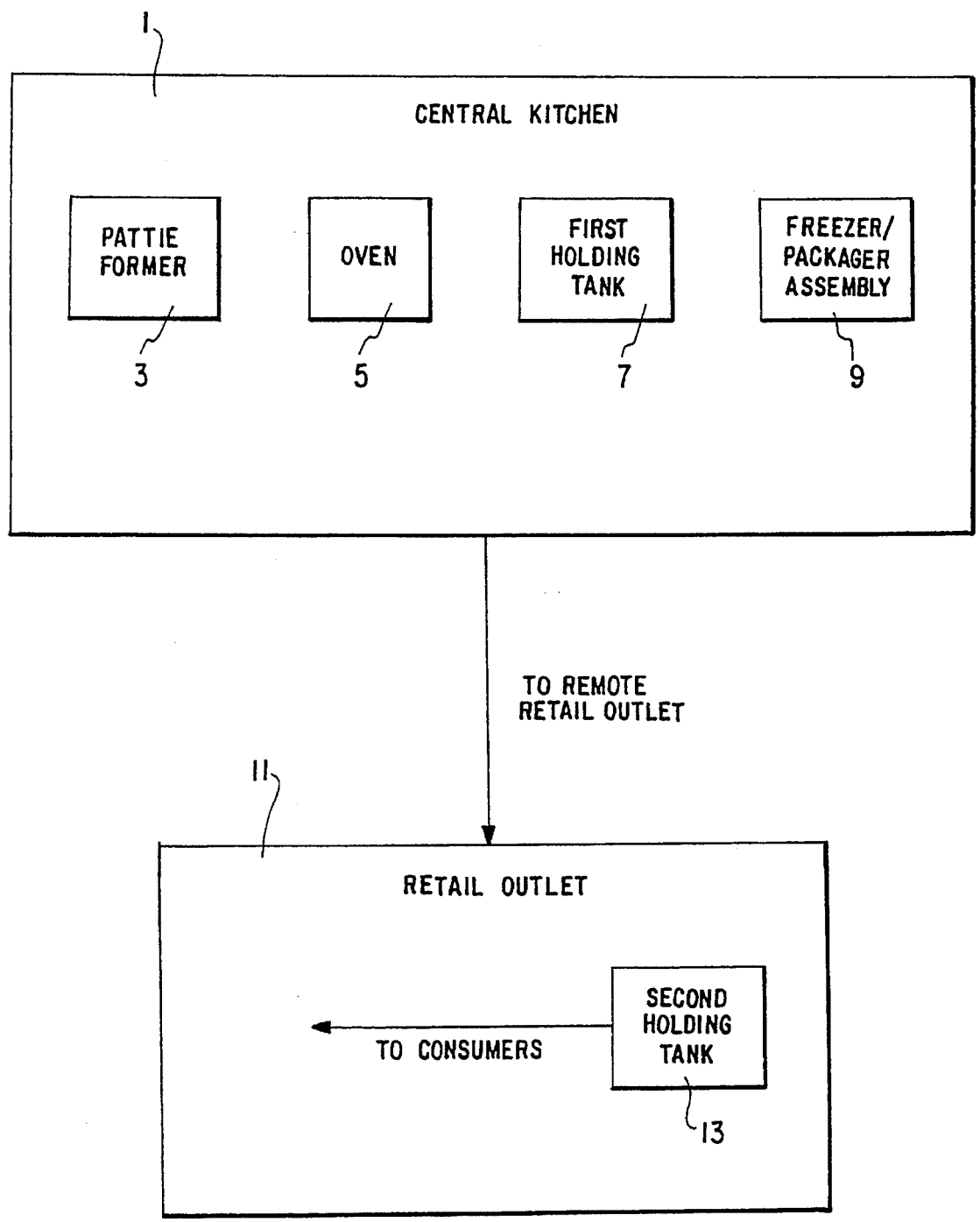
FIG. 1 is a schematic diagram of a process used for the mass production of hamburger patties in accordance with the teachings of the present invention.

The present invention is a method and composition for preserving the flavor and freshness of hamburger and other meat products. The method and composition are particularly suitable for preparing hamburger patties in a large, centralized fast food franchise operation where the patties are prepared for shipment to remote retail outlets.

FIG. 1 illustrates the application of the method of the present invention in a mass production operation. At a central kitchen 1, the hamburger patties are pressed from ground beef by means of a pattie former 3, many of which are known to the prior art. The patties are then cooked in an oven 5, such as a broiler, conveyor type broiler, or vertical broiler, and are immediately transferred to a first holding tank 7. The first holding tank contains a hot bath of flavoring solution. The patties are then frozen in a freezer/packager assembly 9 and shipped to a remote retail outlet 11. At the remote retail outlet, the patties are heated to an appropriate serving temperature in a second holding tank 13. The second holding tank, like the first holding tank, contains a hot bath of the flavoring solution.

The flavoring solution in the holding tanks is formed from the aqueous dilution of the mixture whose components are listed in Table 1:

TABLE 1

| Materials | Relative Amount (grams) |
| --- | --- |
| salt | 1792 |
| hydrolyzed vegetable protein | 92 |
| corn syrup solids | 72 |
| granulated sugar | 72 |
| seasoning powder (Vi-Zate ® 115 HVP)[a] | 60 |
| natural beef flavoring | 40 |
| flavor enhancer (Mertaste ®)[b] | 36 |
| corn sugar dextrose | 20 |
| onion powder | 20 |
| garlic powder | 20 |
| hydrogenate oil | 20 |
| Nova Naturelle ®[c] | 20 |
| food coloring (caramel) | 20 |

[a]Vi-Zate 115 HVP is a food flavoring made from salt and hydrolyzed soy and corn protein, and is commercially available from the Vico Division of A.E. Staley Mfg. Co.
[b]Mertaste ® is a commercially available flavoring enhancer containing disodium inosinate, MSG, salt, and soluble pepper.
[c]Nova Naturelle is a synthetic beef flavoring commercially available from Chaplain Industries, Inc.

The flavoring solution imparts bacterial resistance to the hamburger patties, enhances their flavor, and preserves the freshness and moisture content of the patties during subsequent handling.

The flavoring solution in the holding tanks is preferably maintained at 150° F. although other temperatures may be suitable for particular applications. In commercial use, the solution in the holding tanks is replaced about every 12 hours and the tanks are cleaned between uses to prevent the buildup of hazardous levels of bacteria in the solution or on the surfaces of the tanks.

In its most preferred embodiment, the flavoring solution contains the ingredients listed in Table 1 in their respective relative amounts. However, obvious variations may be made in this recipe without departing from the scope of the present invention. Thus, for example, while the recipe relies on garlic powder and onion powder to impart a desirable flavor to the hamburger pattie, other flavorings known to the art might also be suitable for this purpose. In addition, it is not necessary to use both Nova Naturelie® (a synthetic beef flavoring) and natural beef flavoring; one or both of these ingredients may be used to achieve the desired flavor. Also, it may be desirable in some applications to add beef fat or other additional ingredients to the recipe. Nonetheless, it is preferred that at least the following ingredients, or their equivalents, are used in the flavoring solution: salt, vegetable protein, corn syrup solids, sugar, beef flavoring, seasoning powder, flavor enhancer, corn sugar dextrose, and hydrogenated oil.

The degree to which the meat product is cooked before it is immersed in the flavoring solution may be varied to obtain a desired consistency in the final product. Preferably, however, the meat product is heated to an internal temperature of at least 170° F. In the case of hamburgers, this temperature has been found adequate to reduce the population of viable bacteria present in the meat to levels that are safe for human consumption when the meat is treated with the flavoring solution according to the method of the invention.

It is further preferred that the meat product is transferred to the holding tank immediately after cooking. This will ensure that the meat product does not cool to temperatures that would allow harmful bacterial growth in the meat prior to treatment with the flavoring solution. This objective may be accomplished by cooking the meat in a conveyor broiler, which empties the cooked patties directly into the holding tank.

A significant advantage of the method of the present invention is that it greatly reduces the amount of smoke and oil produced at fast food retail outlets. Hamburgers prepared according to the method of the invention are cooked at a central kitchen and are then shipped to the retail outlet, where they are warmed in an aqueous bath before serving. There is thus no need for open flame broiling of raw patties at the retail outlet, which is a major source of smoke and air born oil.

Furthermore, the cooking of hamburger patties on a large scale at a central kitchen allows for the use of sophisticated pollution control devices that would be too expensive for use at individual retail outlets. These devices significantly reduce the net amount of pollutants released into the atmosphere by the franchise as a whole. In addition, the central kitchen can be located in an area of the country where pollution levels are low and where air quality standards are less restrictive, so that any pollutants that are released into the atmosphere will not result in violations of state or federal environmental laws.

In order that the present invention may be more readily understood, it will be further described with reference to the following specific examples. These examples are given by way of illustration only and are not intended to limit the scope of the invention.

EXAMPLE 1

This example illustrates the preparation of the mixture whose aqueous dilution forms the flavoring solution. The mixture comprises the following ingredients in the relative amounts indicated:

| Materials | Relative Amount (grams) |
|---|---|
| salt | 1792 |
| hydrolyzed vegetable protein | 92 |
| corn syrup solids | 72 |
| granulated sugar | 72 |

-continued

| Materials | Relative Amount (grams) |
|---|---|
| seasoning powder (Vi-Zate ® 115 HVP) | 60 |
| natural beef flavoring | 40 |
| flavor enhancer (Mertaste ®) | 36 |
| corn sugar dextrose | 20 |
| onion powder | 20 |
| garlic powder | 20 |
| hydrogenate&oil | 20 |
| Nova Naturelle ® | 20 |
| food coloring (caramel) | 20 |

The salt and oil are blended together for six (6) minutes. Next, the dry ingredients are added, and the resulting mixture is again blended for six (6) minutes. Finally, the food coloring is added and the mixture is blended for an additional six minutes, after which it is packed in 25 lb. cartons with mixing instructions.

EXAMPLE 2

This example illustrates the preparation of the flavoring solution from the concentrated mixture of Example 1.

The flavoring solution is prepared by mixing 4–8 ounces of the concentrated mixture of Example 1 to 128 ounces of potable water. The solution is brought to a boil. After boiling for 5 minutes, the solution is allowed to cool to 150° F., and is ready for use.

EXAMPLE 3

This example illustrates the use of the flavoring solution for the preparation of hamburger patties at a central kitchen in a fast food franchise operation.

The solution prepared according to Example 2 is maintained in a holding tank at 150° F. The hamburger patties to be treated are cooked in a suitable oven, such as a broiler, conveyor type broiler, or vertical broiler, and are then immediately transferred to the holding tank, where they are immersed for a minimum of 3 minutes. The patties are then frozen and shipped to the retail outlet.

After arrival at the retail outlet, the frozen hamburger patties are immersed in a second holding tank. The second holding tank also contains the flavoring solution prepared according to Example 2 and is also maintained at 150° F. After the patties have attained the desired serving temperature, they may be removed from the holding tank and served over the counter or packaged for takeout. The hamburgers so prepared will taste freshly cooked even several days after they have been shipped from the central kitchen.

Examples 4–7 illustrate the efficacy of the present method and composition in preserving, tenderizing, and flavoring hamburger patties.

EXAMPLE 4

This example illustrates the initial population of bacteria present in a concentrated mixture prepared according to example 1.

A concentrated mixture was prepared according to Example 1. This mixture was tested and found to contain about 1000 viable aerobic bacteria per ml.

Examples 5–6 illustrate the reduction in the population of bacteria as a function of time when the flavoring solution is boiled.

EXAMPLE 5

A portion of the concentrated mixture of Example 4 was added to boiling water and tested immediately for bacteria content. The sample was found to contain about 33 bacteria per ml.

EXAMPLE 6

A portion of the sample of the concentrated mixture of Example 4 was added to boiling water. After the mixture boiled for 5 minutes, the sample was tested and found to contain about 1 bacteria per ml.

EXAMPLE 7

A flavoring solution was prepared in a holding tank by adding a concentrated mixture prepared as in Example 1 to 128 oz. (1 gallon) of boiling, potable water. The solution was allowed to boil for 5 minutes before being allowed to cool to 150° F. Next, a test group of 12 hamburger patties were prepared in a pattie former from commercially available ground beef. The patties were fried to medium to medium-well doneness and were transferred hot to the holding tank. Over a 10 hour period, the hamburgers were removed from the holding tank two at a time at intervals of two hours and tested for viable aerobic bacterial content, including e. coli and salmonella. At the end of the 10 hour period, the remaining two hamburgers were allowed to remain in the holding tank for an additional 14 hours, at which time one of the hamburgers was removed and tested for bacterial content, and the other hamburger was tested for freshness and flavor.

The bacterial count was performed by the Pour Plate Count method using BHI Agar and incubation for 2 days at 90° F. Five replicate 1 ml portions of the seasoning solution were analyzed for viable bacteria. The test results, which are displayed in Table 2, indicate a zero bacterial growth rate in all 11 of the hamburgers tested. The remaining hamburger was sampled for taste. After remaining in the holding tank for over 24 hours, the hamburger was fresh and moist, and was not distinguishable in taste from a freshly cooked hamburger.

TABLE 2

| Cooking Time (hours) | Bacterial Count[a] | |
| --- | --- | --- |
| | Average Count/ml | Average Count/5 ml |
| 0 | 3 | 17 |
| 2 | 3 | 13 |
| 4 | 2 | 7 |
| 6 | 3 | 16 |
| 8 | 2 | 11 |
| 10 | 3 | 17 |
| 24 | 2 | 9 |

[a]Several colonies of bacteria were observed under the microscope, and all were Gram positive, aerobic, spore forming bacteria

EXAMPLE 8

This Example illustrates the relative growth in the bacteria population of the flavoring solution in the holding tank over a three day period, compared with the growth of the bacteria population over the same interval in a cooked hamburger pattie immersed in the flavoring solution.

A seasoning solution was prepared in a holding tank as in Example 7, and cooled to 150° F. A hamburger was fried to medium to medium-well doneness and was transferred hot to the holding tank. After immersion in the tank, a sample of the tank solution was set aside at room temperature, and the hamburger was frozen in a plastic bag. After 3 days, the bacterial content of the frozen hamburger was found to be 3 per ml, and the bacterial content of the solution was 19 per ml.

The above description and examples illustrate the efficacy of the method and composition of the present invention in preserving the freshness and flavor of cooked meat products. The description and examples are meant only to convey an understanding of the present invention, and are not intended to be limiting. Thus, modifications within the scope of the present invention will be apparent to those of skill in the art. The scope of the present invention should be construed only in reference to the appended claims.

What is claimed is:

1. A method for preparing a hamburger pattie in a centralized fast food franchise so as to achieve a minimal growth rate in the population of bacteria present in the hamburger pattie while reducing the amount of smoke and oil generated from cooking the hamburger pattie at a remote retail outlet, the method comprising the steps of:

cooking the hamburger pattie in a central kitchen, without the addition of flavoring, so that it reaches an internal temperature that is sufficiently high to reduce the population of viable bacteria to a level that is safe for human consumption;

immersing the hamburger pattie in a first flavoring solution comprising salt, vegetable protein, corn syrup solids, granulated sugar, beef flavoring, flavor enhancer, corn sugar dextrose, and hydrogenated oil;

freezing the hamburger pattie;

shipping the hamburger pattie to a remote retail outlet; and immersing the hamburger pattie at the retail outlet in a second heated flavoring solution comprising salt, vegetable protein, corn syrup solids, granulated sugar, beef flavoring, flavor enhancer, corn sugar dextrose, and hydrogenated oil.

2. The method of claim 1, wherein the hamburger pattie is immersed in the first flavoring solution immediately after it is cooked.

3. A method for preparing a hamburger pattie to be served at a retail outlet, comprising the steps of:

cooking a hamburger pattie;

immersing the hamburger pattie in a first aqueous flavoring solution comprising salt, vegetable protein, corn syrup solids, sugar, hydrogenated oil, flavor enhancer and beef flavoring;

freezing the hamburger pattie;

shipping the hamburger pattie to a remote retail outlet; and immersing the hamburger pattie at the retail outlet in a second aqueous flavoring solution comprising salt, vegetable protein, corn syrup solids, sugar, hydrogenated oil, flavor enhancer and beef flavoring.

4. The method of claim 3, wherein the hamburger is broiled shortly before it is immersed in the first solution.

5. The method of claim 3, wherein the ingredients of the first solution are present in the following relative amounts by weight:

| Materials | Relative Amount (grams) |
| --- | --- |
| salt | 1792 |
| vegetable protein | 92 |
| corn syrup solids | 72 |
| sugar | 72 |
| flavor enhancer | 36 |
| corn sugar dextrose | 20 |
| hydrogenated [hydrogenate] oil | 20 |

6. The method of claim 3, wherein the ingredients of the second solution are present in the following relative amounts by weight:

| Materials | Relative Amount (grams) |
| --- | --- |
| salt | 1792 |
| vegetable protein | 92 |
| corn syrup solids | 72 |
| sugar | 72 |
| flavor enhancer | 36 |
| corn sugar dextrose | 20 |
| hydrogenated [hydrogenate] oil | 20 |

7. The method of claim 3, wherein the hamburger pattie is cooked until it reaches an internal temperature of at least about 150° F.

8. The method of claim 3, wherein the first solution is heated to about 150° F.

9. The method of claim 3, wherein the second solution is heated sufficiently so that a hamburger immersed in the solution will be warmed to an appropriate serving temperature.

10. A method for preparing a hamburger pattie for service at a retail outlet, comprising the steps of:

broiling a hamburger pattie until it reaches an internal temperature of at least about 150° F.;

immersing the hamburger pattie in a first aqueous flavoring solution which is maintained at a temperature of about 150° F., and which comprises salt, vegetable protein, corn syrup solids, sugar, hydrogenated oil, flavor enhancer, and beef flavoring;

freezing the hamburger pattie;

shipping the hamburger pattie to a remote retail outlet; and immersing the hamburger pattie at the retail outlet in a second flavoring solution which is maintained at a temperature of about 150° F., and which comprises salt, vegetable protein, corn syrup solids, sugar, hydrogenated oil, flavor enhancer, and beef flavoring.

\* \* \* \* \*